Nov. 25, 1958     H. W. CHILDRESS     2,861,377
HOOK AND LURE SAVER
Filed Aug. 31, 1956

INVENTOR.
HUNTER W. CHILDRESS
BY Patrick D. Beavers
ATTORNEY

United States Patent Office 2,861,377
Patented Nov. 25, 1958

2,861,377

HOOK AND LURE SAVER

Hunter W. Childress, Richmond, Va.

Application August 31, 1956, Serial No. 607,367

1 Claim. (Cl. 43—17.2)

This invention relates to improvements in fishing equipment and more particularly to a hook and lure saver.

An object of the invention is to provide a device of the character that is adapted to be attached to the end of a paddle or oar to free hooks and lures from submerged objects when fishing in shallow water.

Another object of the invention is to provide a device of the character that is simple in construction, having no moving parts, is economical to construct, easy and simple to operate and light in weight.

The device may be used with any type of paddle or oar and affords an efficient device for freeing hooks and lures without extra effort or assembly on the part of the fisherman.

With the above and other objects and advantages in view the invention consists of the novel details of construction, arrangement and combination of parts more fully hereinafter described, claimed and illustrated in the accompanying drawing in which:

Figure 1:
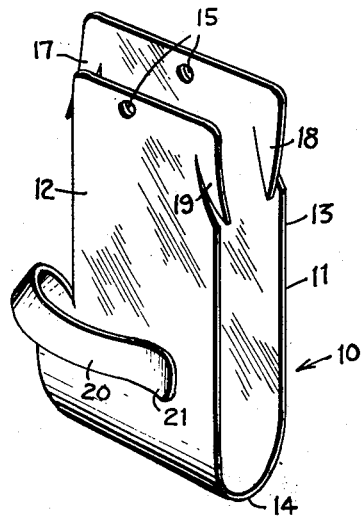
Fig. 1 is a perspective view of a device embodying the invention.
Figure 2:
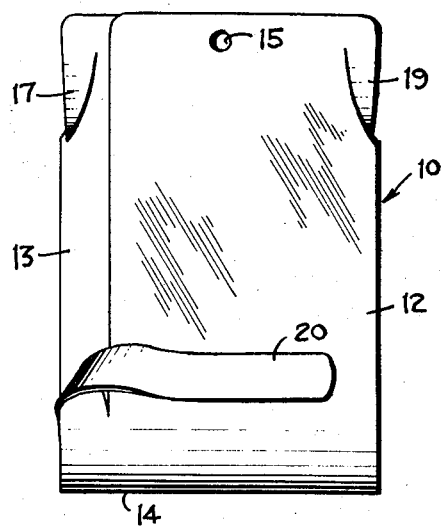
Fig. 2 is a front elevational view of the device.
Figure 3:
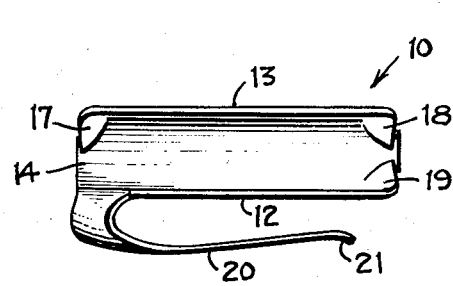
Fig. 3 is a top plan view of the device.
Figure 4:
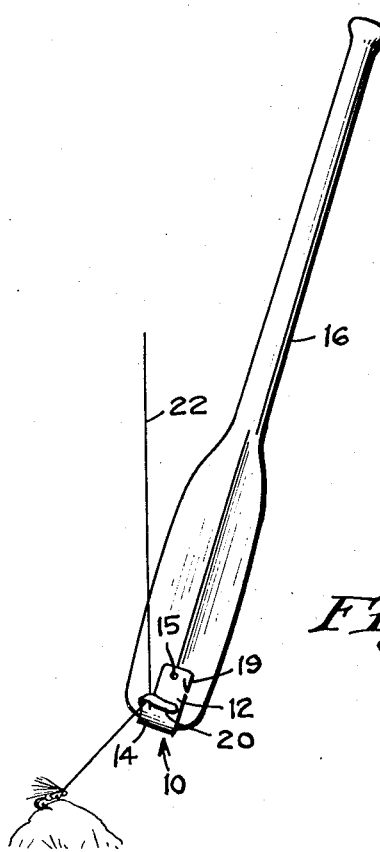

Fig. 4 showing the device attached to a paddle and in the act of releasing a snagged hook.

Referring more in detail to the drawing, wherein like parts are designated by like reference numerals, the hook and lure saver embodying the invention is generally designated by the reference numeral 10.

The hook and lure saver 10 comprises a U-shaped body 11 which comprises a pair of parallel rectangular shaped plates 12 and 13, respectively, which are joined at one of the ends by a curved portion 14.

The opposite ends of the plates 12 and 13 are provided with openings 15, whereby fasteners may permanently attach the hook and lure saver 10 to a paddle 16 or the like.

To temporarily attach the hook and lure saver 10 to the paddle 16, a pair of inturned spurs 17 and 18, respectively, are struck out from the plate 13 and a similar spur 19 is struck out from the plate 12 in alinement with the spur 18.

When the paddle 16 is inserted between the plates 12 and 13, the spurs 17, 18 and 19 tend to spring the plates 12 and 13 apart to aid the insertion of the paddle 16, however, a downward pull on the hook and lure saver 10 or an upward pull on the paddle 16 will cause the spurs 17, 18 and 19 to dig into the paddle 16 to retain the hook and lure saver 10 on the paddle 16.

The hook and lure saver 10 may be removed by a slight outward pressure on the plates 12 and 13 by a knife blade or screw driver.

A small leaf or finger 20 is struck out from the side of the plate 12 opposite to the side having the spur 19 thereon, and the leaf or finger 20 is bent across the face of the plate 12 in a slight curve. The outer end 21 of the leaf or finger 20 is bent slightly outwardly of the plate 12 to permit a fishing line 22 to be inserted under the leaf or finger 20, as shown in Fig. 4.

In use, the line 22 is slipped under the leaf or finger 20 and the paddle 16 is lowered into the water. The shape of the leaf or finger 20 retains the line 22 in close association with the paddle 16. As the hook and lure saver 10 nears the hook or lure, as shown in Fig. 4, it may be moved to disengage the hook or lure from its snagged position.

Movement of the paddle is determined by the position of the hook and lure.

It is believed that from the foregoing description the structure and use of the invention will be apparent to those skilled in the art and it is to be understood that changes in the minor details of construction, arrangement and combination of parts may be resorted to provided they fall within the spirit of the invention and the scope of the appended claim.

Having thus described the invention what is claimed as new and desired to be secured by Letters Patent is:

The combination of an oar and means removably connected thereto for removing a hook or lure from a snagged position, said means comprising a U-shaped body for receiving a portion of said oar, spurs formed at the free-end portions of said body for removably attaching said body to said oar and wherein a transversely extending finger is integrally formed with said body whereby to provide a fishing line guide.

References Cited in the file of this patent

UNITED STATES PATENTS

| 2,448,864 | Crandall | Sept. 7, 1948 |
| 2,721,413 | Seidel | Oct. 25, 1955 |